US010282371B1

(12) United States Patent
Gaither

(10) Patent No.: US 10,282,371 B1
(45) Date of Patent: May 7, 2019

(54) OBJECT STORAGE DEVICE WITH PROBABILISTIC DATA STRUCTURE

(71) Applicant: Western Digital Technologies, Inc., Irvine, CA (US)

(72) Inventor: Blaine Gaither, Fort Collins, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 565 days.

(21) Appl. No.: 14/557,601

(22) Filed: Dec. 2, 2014

(51) Int. Cl.
*G06F 17/30* (2006.01)
*G06F 16/28* (2019.01)
*G06F 16/27* (2019.01)
*G06F 16/22* (2019.01)
*G06F 16/2458* (2019.01)

(52) U.S. Cl.
CPC ........ *G06F 16/289* (2019.01); *G06F 16/2255* (2019.01); *G06F 16/2468* (2019.01); *G06F 16/27* (2019.01)

(58) Field of Classification Search
CPC ........... G06F 17/30592; G06F 16/2468; G06F 16/2256
USPC ........................................ 707/609, 602, 756
See application file for complete search history.

(56) References Cited

U.S. PATENT DOCUMENTS

| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |

(Continued)

OTHER PUBLICATIONS

Dean M. Jenkins et al., U.S. Appl. No. 14/547,500, filed Nov. 19, 2014, 33 pages.

*Primary Examiner* — Jean M Corrielus
(74) *Attorney, Agent, or Firm* — Barry IP Law, P.C.

(57) ABSTRACT

Systems and methods for utilizing probabilistic data structures to handle interrogations regarding whether or not objects might be stored in an object store of an object storage device are disclosed. More particularly, a controller of an object storage device includes control circuitry and a memory operative to store a probabilistic data structure. The probabilistic data structure has data related to the presence of data in an object store of the object storage device. The control circuitry is configured to receive an interrogation from a computing device for an object; utilize the probabilistic data structure to determine that the object is possibly stored in the object store or definitely not stored in the object store; and in response to a determination that the object is definitely not stored in the object store, respond to the interrogation that the object is not stored in the object store.

12 Claims, 8 Drawing Sheets

(56) References Cited

U.S. PATENT DOCUMENTS

| | | |
|---|---|---|
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |

(56) References Cited

U.S. PATENT DOCUMENTS

| | | |
|---|---|---|
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,424,498 B1 * | 9/2008 | Patterson ............ G06F 12/0253 |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,707,166 B1 * | 4/2010 | Patterson ............ G06F 12/0253 |
| | | 707/999.206 |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,783,682 B1 * | 8/2010 | Patterson ............ G06F 12/0253 |
| | | 707/609 |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |

(56) References Cited

U.S. PATENT DOCUMENTS

| | | |
|---|---|---|
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,290,972 B1 * | 10/2012 | Deshmukh ........ G06F 17/30489 707/758 |
| 8,296,274 B2 * | 10/2012 | Leppard ............. H03M 7/3091 707/692 |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,688,780 B2 * | 4/2014 | Gordon ............. G05B 19/4185 709/204 |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,953,269 B1 | 2/2015 | Hamilton et al. |
| 9,009,111 B2 * | 4/2015 | Vermeulen ........ G06F 17/30212 707/626 |
| 9,032,152 B2 * | 5/2015 | Svendsen ........... G06F 12/0895 711/118 |
| 9,448,927 B1 * | 9/2016 | Agarwala .......... G06F 12/0253 |
| 9,646,035 B1 * | 5/2017 | Dickson ............. G06F 17/3033 |
| 9,684,590 B2 * | 6/2017 | Haines ................ G06F 12/0246 |
| 9,753,964 B1 * | 9/2017 | Marshall ........... G06F 17/30339 |
| 2009/0113702 A1 | 5/2009 | Hogg |
| 2010/0306551 A1 | 12/2010 | Meyer et al. |
| 2010/0325083 A1 * | 12/2010 | Soulard .................. G06F 8/31 706/55 |
| 2011/0226729 A1 | 9/2011 | Hogg |
| 2012/0102276 A1 * | 4/2012 | Haines ............... G06F 12/0246 711/154 |
| 2012/0136871 A1 * | 5/2012 | Soulard ........... G06F 17/30958 707/741 |
| 2012/0158800 A1 * | 6/2012 | Peters ............... G06F 17/30536 707/812 |
| 2012/0159042 A1 | 6/2012 | Lott et al. |
| 2012/0182639 A1 | 7/2012 | Hostetter et al. |
| 2012/0197851 A1 * | 8/2012 | Leppard .............. H03M 7/3091 707/692 |
| 2012/0271844 A1 * | 10/2012 | Selbie ............... G06F 17/30722 707/769 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0103711 A1 * | 4/2013 | Woodruff .......... G06F 17/30486 707/769 |
| 2013/0103713 A1 * | 4/2013 | Woodruff .......... G06F 17/30486 707/769 |
| 2013/0159251 A1 * | 6/2013 | Skrenta ............. G06F 17/30339 707/612 |

(56) References Cited

U.S. PATENT DOCUMENTS

| | | | |
|---|---|---|---|
| 2013/0318051 A1 | 11/2013 | Kumar et al. | |
| 2014/0201129 A1* | 7/2014 | Gupta | G06F 17/30592 |
| | | | 707/602 |
| 2014/0201424 A1 | 7/2014 | Chen et al. | |
| 2014/0207868 A1* | 7/2014 | Gordon | G05B 19/4185 |
| | | | 709/204 |
| 2014/0289467 A1* | 9/2014 | Svendsen | G06F 12/0895 |
| | | | 711/118 |
| 2014/0304238 A1* | 10/2014 | Halla-Aho | H04L 51/12 |
| | | | 707/692 |
| 2015/0081710 A1* | 3/2015 | Ketkar | G06F 17/30952 |
| | | | 707/737 |

* cited by examiner

US 10,282,371 B1

OBJECT STORAGE DEVICE WITH PROBABILISTIC DATA STRUCTURE

TECHNICAL FIELD

This disclosure relates to information storage and, more particularly, to object storage devices that include probabilistic data structures to handle interrogations regarding whether or not objects might be stored in an object store.

BACKGROUND

Many computing systems generate or receive data that may be desirable to store persistently. These computing systems often utilize a storage device, such as a hard disk drive ("HDD"), for data storage and retrieval. In some cases, a HDD can include a circular recording disk made from a magnetic material onto (and/or into) which data can be recorded as patterns of magnetic polarity. In other cases, a storage device can include integrated circuit solid-state memory assemblies onto (and/or into) which data can be recorded.

In various cases, storage devices may be file system storage devices (which manage data as a file hierarchy) or block storage devices (which manage data as blocks of a storage media). However, in other cases storage devices may be object storage devices where objects may be stored in an unstructured fashion in an object store and are accessed utilizing a unique identifier referred to as a "key," abstracting interaction with objects in the object store from the physical storage media used to store the object store.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Some embodiments described herein relate to systems and methods for utilizing probabilistic data structures to handle interrogations regarding whether or not objects might be stored in an object store of an object storage device. A controller of an object storage device may process interrogations utilizing a probabilistic data structure stored in a memory having data related to the presence of data in the object store. The controller may receive an interrogation, utilize the probabilistic data structure to determine whether or not the object is possibly stored in the object store, and respond accordingly based on the determination.

The controller may be able to determine from the probabilistic data structure that either the object is definitely not stored in the object store or may possibly be stored in the object store. In cases where the controller is able to determine from the probabilistic data structure that the object is not stored, the controller may be able to process the interrogation without having to access the object store. Evaluation of the probabilistic data structure may be faster than accessing of the object store and therefore use of the probabilistic data structure may reduce the time that the controller consumes in processing the interrogation.

If the controller is not able to determine that the object is not stored in the object store using the probabilistic data structure, the controller may then access the object store to determine whether or not the object is actually stored. Though this case may not reduce the time used by the controller to process interrogations, the overall time used by the controller in processing interrogations may be less than if the controller always accessed the object store as not every interrogation request requires access of the object store for processing. In systems involving interrogations sent to controllers of multiple object storage devices, the total time involved for processing all the interrogations may be improved over systems where every object store is accessed as only the system may not be required to wait for each object storage device to access the object store.

Although particular embodiments are discussed herein, it should be appreciated that the various embodiments, as well as functionality, operation, components, and capabilities thereof may be combined with other elements as necessary. Any physical, functional, or operational discussion of any element or feature is not intended to be limited solely to a particular embodiment to the exclusion of others.

Figure 1:
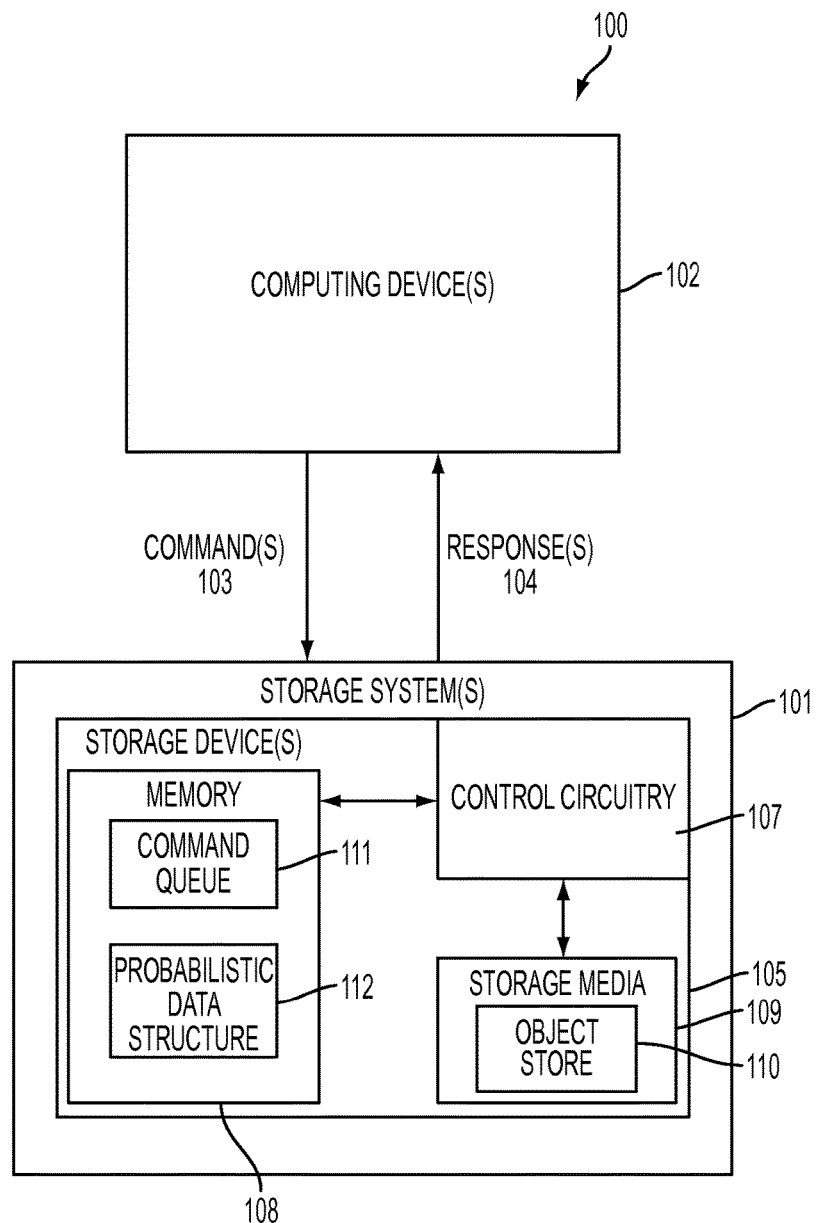
FIG. 1 depicts a simplified block diagram of an example system with an example object storage device that may be configured to utilize probabilistic data structures to handle interrogations regarding whether or not objects might be stored in an object store.

FIG. 1 depicts a simplified block diagram of an example system 100 with an example object storage device 105 that may be configured to utilize one or more probabilistic data structures 112 to handle interrogations regarding whether or not objects might be stored in an object store 110. As illustrated, the system 100 may include one or more data storage systems 101, of which the object storage device 105 (and/or other storage devices) is a part, that may be configured to communicate with one or more computing devices 102. The computing device may be any electronic device such as a laptop computer, desktop computer, server, cellular phone, tablet computer, and so on. In some embodiments, the computing device can be implemented as a system of individual electronic devices, for example, as a network of servers.

The computing device 102 may send commands 103 to the object storage device 105. The commands may be any number of commands including, but not necessarily limited to, write commands, erase commands, and read commands. The object storage device may include control circuitry 107 (such as a controller, an electrical circuit, an integrated circuit, instructions executed by a processor, and so on), a memory 108, and a storage media 109 (such as a circular recording disk made from a magnetic material onto and/or into which data can be recorded as patterns of magnetic polarity, integrated circuit solid-state memory assemblies onto and/or into which data can be recorded, phase change memory, magnetoresistive memory, and so on) that may persistently store an object store. The memory may store a command queue 111. The control circuitry may receive the commands, store the commands in the command queue (though some commands may be executed without being stored in the command queue), and execute commands stored in the command queue (such as in a first-in-first-out order, pipelining configurations where various portions of commands are acted upon in various orders to reduce time used for executing the commands, and so on). The control circuitry may transmit one or more responses 104 to the computing device (such as in response to receiving a command, as part of executing a received command, and so on). For one example, if the computing device sends a read command for an object stored in the object store, the object storage device may send a response including the requested object.

The commands 103 may involve one or more interrogations regarding whether or not an object is stored in the object store 110. For example, a read request for an object may involve determination of whether the object is in the object store to be read. By way of another example, a write request for an object may involve determining of whether the object is already stored in the object store to obviate writing the object to the object store, overwriting the object where it is stored, and so on. By way of still another example, some commands may only attempt to determine whether or not an object is stored in the object store.

The control circuitry 107 may process or handle commands involving interrogations in a variety of ways. In some cases, the commands may be placed into the command queue 111 and the interrogation processed when reached in the queue (whether as part of executing the associated command, part of a prefetching or other pipelining technique, and so on). In other cases, the command may be of a type to which the control circuitry is configured to handle without placing the command in the command queue. Various configurations are possible without departing from the scope of the present disclosure.

When processing an interrogation regarding an object, the control circuitry 107 may evaluate a probabilistic data structure 112 (such as a Bloom filter, a quotient filter, an approximate membership query data structure, or other probabilistic data structure used to track whether an item is definitely not part of a set or may be part of a set) stored in the memory 108 using a key (which may be based on a name of the object, be based on data included in the object, be a unique identifier assigned to the object, and so on) associated with the object to determine if the object is not stored in the object store 110 or may be stored in the object store. The probabilistic data structure may be probabilistic in that it has data related to the presence of data in the object store that can either definitely confirm that the object is not in the object store or indicate that the object is possibly stored. The data may be unable to be used to definitely confirm that the object is stored in the object store as portions of the data may correspond to multiple different objects. As such, a particular portion may indicate that any number of a specific set of objects may be stored in the object store but may not definitely indicate that any particular object of that specific set is definitely stored. However, that particular portion may indicate that a particular object of the set is definitely not stored, if the particular portion indicates that none of the specific set of objects are stored.

Upon determining that an object associated with an interrogation request is definitely not stored in the object store 110 using the probabilistic data structure 112, the control circuitry 107 may respond to the interrogation accordingly. In some cases, responding to the interrogation may include transmitting one or more indications to the computing device 102 (such as one or more indications that the object is definitely not stored, one or more indications that the object may be stored, and so on). However, in other cases responding to the interrogation may not transmit to the computing device. Instead, in such cases responding to the interrogation may involve performing further processing (such as processing of a related command) based on the determination that the object is not stored. For example, responding to an interrogation related to a write request for an object upon determining that the object is definitely not stored may involve allocating space in the object store for the object and/or storing the object in the object store (such as in the allocated space).

Upon determining that an object associated with an interrogation request may be stored in the object store 110 using the probabilistic data structure 112, the control circuitry 107 may access the object store to determine if the object is definitely stored in the object store. The control circuitry may then respond to the interrogation request accordingly upon the access determining whether or not the object is definitely stored in the object store.

Again, in some cases, responding to the interrogation may include transmitting one or more indications to the computing device 102. However, in other cases responding to the interrogation may involve performing further processing based on the access determining that the object is definitely stored or not. For example, responding to an interrogation related to a write request for an object upon the access determining that the object is definitely not stored may involve allocating space in the object store 110 for the object and/or storing the object in the object store. By way of another example, responding to an interrogation related to a read request for an object upon the access determining that the object is definitely stored may involve providing the object to the computing device, caching the object in the memory 108 and/or otherwise copying the object to the memory, and/or other operations. By way of still another example, responding to an interrogation related to a write request for an object upon the access determining that the object is definitely stored may involve overwriting the currently stored version of the object in the object store, aborting the write operation as the object is already stored, and/or other operations.

By way of an example implementation regarding the probabilistic data structure 112, a Bloom filter configured to include data related to the presence of data in the object store 110 may be implemented as an array (and/or other data structure) of bit values. When no objects have been stored in the object store, the values of the array may all be set to zero. However, when an object is stored in the object store the key associated with the object may be passed through a hashing function to generate a hash value corresponding to one of the positions in the array, the value stored at which may then be set to one to represent that the object was stored in the object store. As the keys for multiple objects may hash to set a position of the array to one (causing a collision in the array if those multiple objects are stored, resulting in an existing one value staying as a one value), determining that position has a one value indicates that one or more of those multiple objects may be stored but does not definitely indicate that a specific one of those multiple objects definitely is stored. However, determining that position has a zero value indicates that none of those multiple objects are stored. As such, the Bloom filter can be used to determine that an object is definitely stored in the object store or may be stored in the object store. Although the examples in this disclosure use zero and one values, other indicators may be used in lieu of the zero and one values to represent the status and result of the hash functions.

Figure 2A:
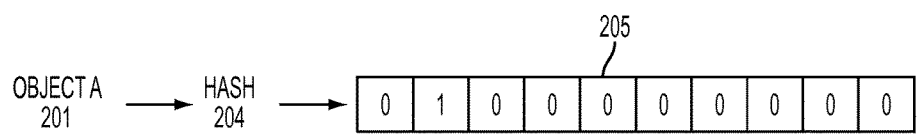
FIG. 2A depicts a diagram of generating an example hash value for an object A utilizing a hash function.

By way of example, FIG. 2A depicts a diagram of generating an example hash value 205 for an object A 201 utilizing a hash function 204. Similarly, FIG. 2B depicts a generation of an example hash value 206 for an object B 202 utilizing the hash function 204 and FIG. 2C depicts generation of an example hash value 207 for an object C 203 utilizing the hash function 204.

As illustrated in FIG. 2A, processing the key for object A 201 with the hash function 204 results in one value being set at the second leftmost position of the array 205 while the values of the other positions remain set to zero. Similarly, as illustrated in FIG. 2A, processing the key for object B 202 with the hash function results in one value being set at the second leftmost position of the array 206, identical to the array 205 of FIG. 2A. However, as illustrated in FIG. 2C, processing the key for object C 203 with the hash function results in one value being set at the leftmost position of the array 207 while the values of the second leftmost position and other positions remain zero, different from the arrays 205 and 206. Thus, storing of objects A and B in the same object store would result in a collision at the second leftmost position of a probabilistic data structure 112 that uses the hash function whereas storing either objects A and C or B and C would not result in a collision. As such, the probabilistic data structure 112 that uses the hash function could be used determine that objects A and B are definitely not stored if the second leftmost bit has a value of zero, but could only determine that either objects A or B are possibly stored if the second leftmost bit has a value of one.

Figure 3A:
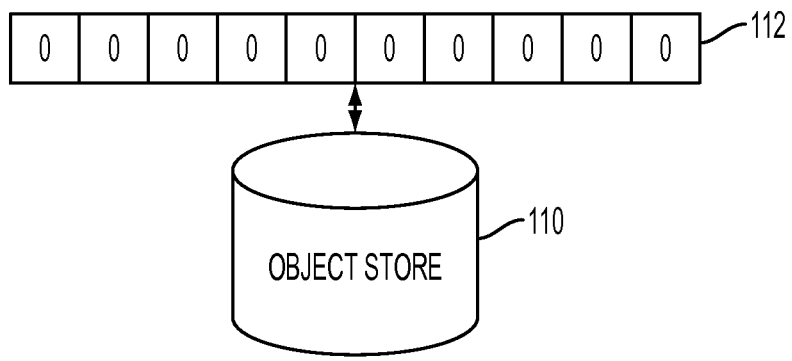
FIG. 3A depicts a diagram of an example object store and an associated example probabilistic data structure having data related to the presence of data in the object store.

By way of example, FIG. 3A depicts a diagram of an example object store 110 and an associated example probabilistic data structure 112 having data related to the presence of data in the object store based on the hash function 204. As illustrated in FIG. 3A, no objects have yet been stored in the object store and all of the positions in the array of the probabilistic data structure store zero values.

Figure 2B:
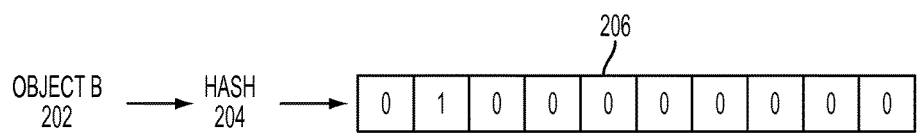
FIG. 2B depicts a diagram of generating an example hash value for an object B utilizing the hash function.
Figure 2C:
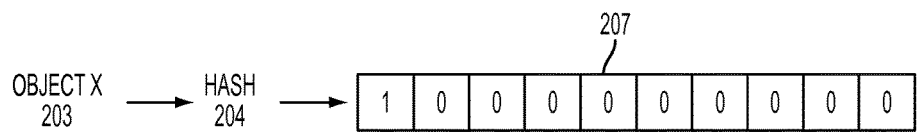
FIG. 2C depicts a diagram of generating an example hash value for an object C utilizing the hash function.
Figure 3B:
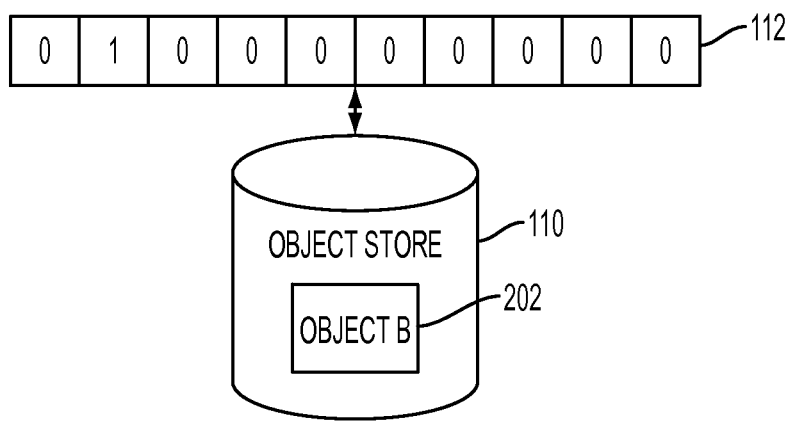
FIG. 3B depicts the example object store and associated example probabilistic data structure of FIG. 3A after the object B is stored in the object store.

FIG. 3B depicts the example object store 110 and associated example probabilistic data structure 112 of FIG. 3A after the object B 202 of FIG. 2B is stored in the object store. As illustrated, the second leftmost bit of the probabilistic data structure is set to a value of one. Subsequently, the probabilistic data structure may be used to determine that either object A 201 of FIG. 2A or object B of FIG. 2B may be stored in the object store because the value of the second leftmost bit is set to one, but not that either are definitely stored because the one value could indicate storage of either or both. However, the probabilistic data structure may be used to determine that object C 203 of FIG. 2C is definitely not stored because the value of the leftmost bit of the probabilistic data structure is set to zero.

Returning to FIG. 1, in various implementations the control circuitry 107 may determine to replace the probabilistic data structure 112. As portions of the probabilistic data structure may relate to the possible presence of multiple different objects in the object store 110, the probabilistic data structure may be modified based on storage of new objects but may not be able to be updated when objects are removed and/or deleted from the object store. This may be due to the fact that modifying the portion to indicate storage of a newly stored object when the portion already indicates storage of another object would not change the value, but modifying the portion to indicate deletion would change the value without the ability to determine whether or not that portion also indicates storage of another object which is still stored.

For example, if the object A 201 of FIG. 2A was stored in the object store 110 illustrated in FIG. 3B after storage of object B 202, the probabilistic data structure would not change because the second leftmost position already has a value of one. However, if object B was then deleted, the value second leftmost position of the probabilistic data structure could not be set to zero without rendering the probabilistic data structure inaccurate regarding storage of object A.

Thus, at various times during operation in various implementations the control circuitry 107 may determine to replace the probabilistic data structure 112. Upon such a determination, the control circuitry may create a new probabilistic data structure in the memory 108. The control circuitry may analyze the object store 110 to determine objects stored and modify the new probabilistic data structure to indicate such storage. Upon completion of modifying the new probabilistic data structure to account for all objects stored in the object store, the control circuitry may begin using the new probabilistic data structure instead of the probabilistic data structure 112. The control circuitry may then deallocate the probabilistic data structure 112, delete the probabilistic data structure 112, clear the values of the probabilistic data structure 112 (such as by setting the array values of a Bloom filter to all zeros) such that the probabilistic data structure 112 can later be reused, and/or perform other such operations.

However, the control circuitry 107 may store new objects in the object store 110 prior to completion of modifying the new probabilistic data structure. If the control circuitry updates the probabilistic data structure 112 but not the new probabilistic data structure to account for the newly stored object, then the new probabilistic data structure will not accurately indicate objects stored in the object store upon completion. However, if the control circuitry updates the new probabilistic data structure but not the probabilistic data structure 112 to account for the newly stored object, then the probabilistic data structure 112 will not accurately indicate objects stored in the object store prior to completion of the new probabilistic data structure. As such, the control circuitry may update both the probabilistic data structure 112 and the new probabilistic data structure when new objects are stored prior to completion of the new probabilistic data structure.

The control circuitry 107 may determine to replace the probabilistic data structure 112 upon the occurrence of a variety of different conditions. For example, the control circuitry may track the number of times that the probabilistic data structure results in a false positive (an indication that an object may be stored in the object store 110 that is proven incorrect upon access of the object store to locate the object) and the control circuitry may determine to replace the probabilistic data structure if the number of false positives exceeds a threshold (such as ten thousand). By way of another example, the control circuitry may track the amount of time that the probabilistic data structure is used and determine to replace the probabilistic data structure if that time exceeds a threshold (such as one month, a number of clock cycles corresponding to two weeks, a number of data requests, and/or another period of time) under the assumption that the probabilistic data structure will be sufficiently inaccurate after that threshold period of time to justify replacement. By way of still another example, the control circuitry may track the number of object delete requests that are received and determine to replace the probabilistic data structure if that number exceeds a threshold (such as fifty thousand object deletion requests) under the assumption that the probabilistic data structure will be sufficiently inaccurate after that threshold number of deletions to justify replacement.

Although FIG. 1 is illustrated and described as utilizing a single probabilistic data structure 112, it is understood that this is an example. In various implementations, multiple probabilistic data structures may be used in various ways without departing from the scope of the present disclosure. In some cases of implementations where multiple probabilistic data structures are utilized, the control circuitry 107 may select one or more of the multiple probabilistic data structures to use.

For example, in various implementations the memory 108 may store first and second probabilistic data structures where the first probabilistic data structure is smaller than the second probabilistic data structure (and/or includes fewer values in its lookup set than the second probabilistic data structure). As the first probabilistic data structure is smaller than the second, use of the first may be faster than use of the second. In some implementations of this example, the control circuitry may select to use the first probabilistic data structure as opposed to the second under the assumption that the quicker determination of definitely not stored will outweigh an increased amount of time spent accessing the object store 110 in the case of determining possibly stored. In other implementations of this example, the control circuitry may select to use the second probabilistic data structure as opposed to the first under the assumption that the quicker determination of definitely not stored will not outweigh an increased amount of time spent accessing the object store 110 in the case of determining possibly stored. In still other implementations of this example, the probabilistic data structure used by the control circuitry may be specified in the interrogation.

However, as the first is smaller than the second, more objects may correlate to the same portions of the first probabilistic data structure than the second and thus use of the first may result in more false positives. As such, in some implementations of this example the control circuitry 107 may first utilize the first probabilistic data structure and then utilize the second if use of the first indicates that an object may be stored in the object store 110. In this way, the control circuitry obtains the time benefit of using the first probabilistic data structure when possible and then resorts to the higher time cost of using the second probabilistic data structure but still avoids the even higher time cost of accessing the object store when that is possible.

By way of another example, the storage media 109 may store multiple object stores 110 and the memory 108 may store a separate probabilistic data structure 112 for each of the different object stores. In this example, the control circuitry 107 may select to use the probabilistic data structure that corresponds to the respective object store. In cases of this example where multiple object stores may be checked for an object, the control circuitry may use each of the probabilistic data structures that correspond to each of the object stores in order to determine whether or not the object may be stored in the respective object store.

In various implementations, the control circuitry 107 may utilize the probabilistic data structure 112 as part of a power management system for the object storage device 105. For example, the object storage device may include a number of power states. Such multiple power states may include a state such as a normal operating state where access mechanisms associated with accessing the storage media 109 are active and a low power state where power is not provided to the access mechanisms (e.g., the disk in an HDD may be spun down). When the object storage device is such a low power state and an interrogation regarding an object is received, power may be provided to the access mechanisms (and/or the object storage device may be transitioned from such a low power state to a higher power state such as the above described normal operating state) when use of the probabilistic data structure indicates that the object may be stored in the object store 110. By way of contrast, when use of the probabilistic data structure indicates that the object is definitely not stored, power may not be provided to the access mechanisms. In this way, power consumption by the access mechanisms may be reduced or eliminated when possible.

In other examples of such an implementation, the object storage device 105 may operate in a power state where power is not provided to such access mechanisms until an interrogation regarding an object is received and subsequent evaluation of the probabilistic data structure 112 indicates that the object may be stored in the object store 110.

Figure 4:
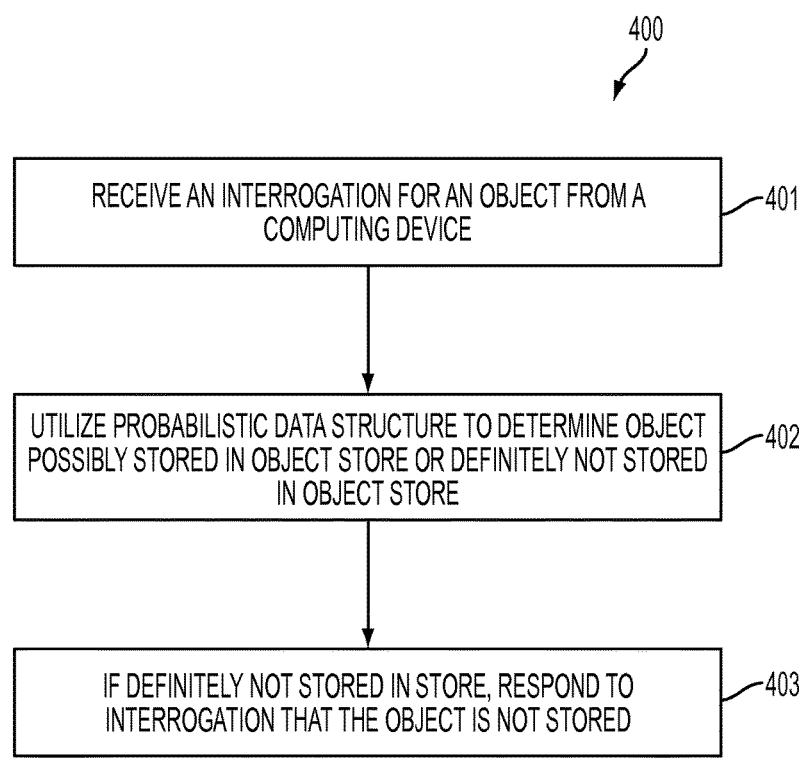
FIG. 4 depicts a flow chart of sample operations of a first example method of utilizing probabilistic data structures to handle interrogations regarding whether or not objects might be stored in an object store.

FIG. 4 depicts a flow chart of sample operations of a first example method 400 of utilizing probabilistic data structures to handle interrogations regarding whether or not objects might be stored in an object store. At block 401, a controller of an object storage device may receive an interrogation for an object from a computing device. The flow may then proceed to block 402 where the controller utilizes a probabilistic data structure to determine whether the object is possibly stored in an object store or definitely not stored in the object store. Finally, the flow may proceed to block 403 where the controller responds to the interrogation that the object is not stored if the controller determines by using the probabilistic data structure that the object is definitely not stored.

Although the example method 400 is illustrated and described as including particular operations performed in a particular order, it is understood that this is an example. In various implementations, various orders of the same, similar, and/or different operations may be performed without departing from the scope of the present disclosure. For example, in some implementations the method may include an additional operation of accessing the object store to determine whether or not the object is stored if the controller determines by using the probabilistic data structure that the object is might be stored.

Figure 5:
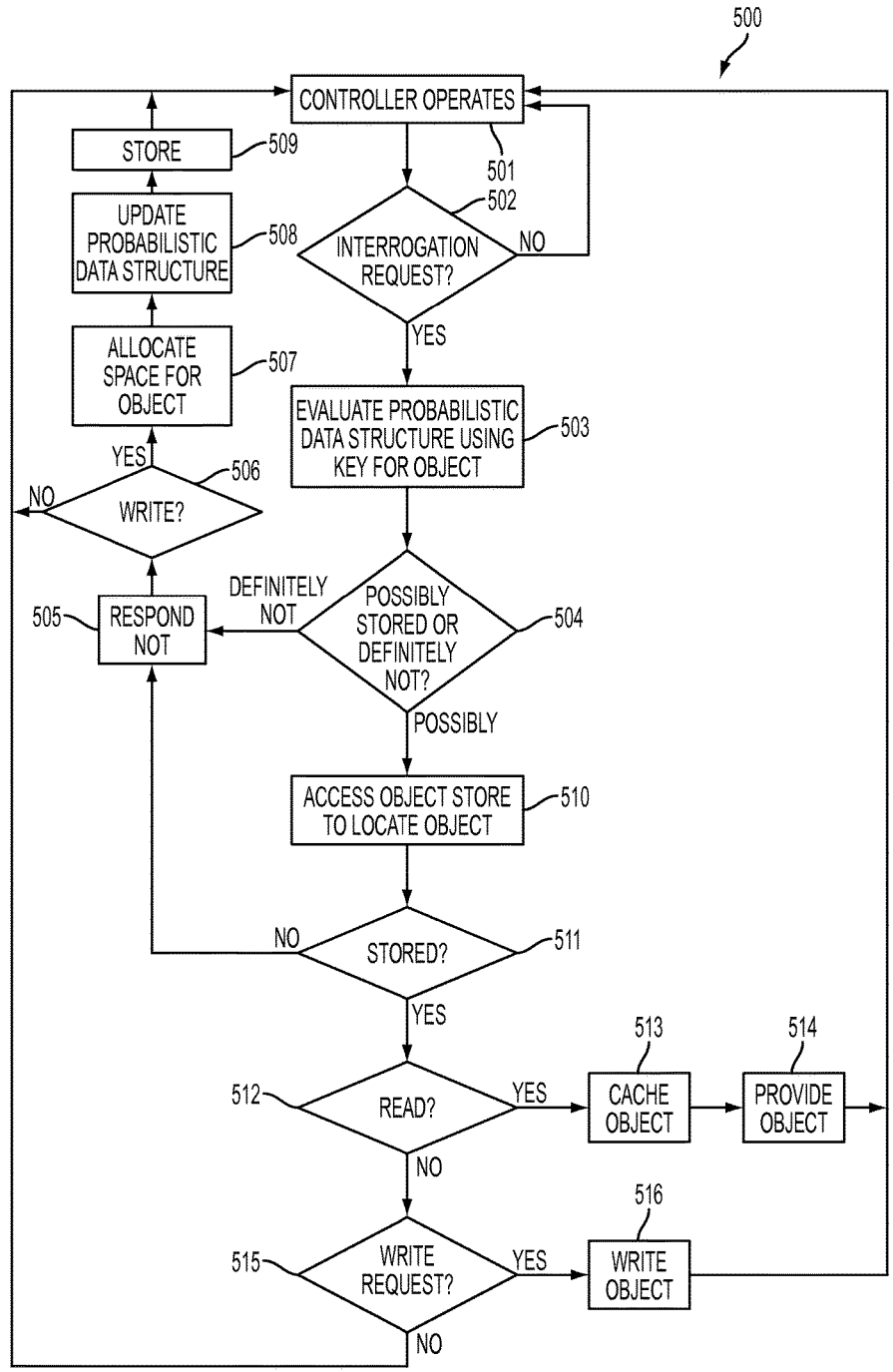
FIG. 5 depicts a flow chart of sample operations of a second example method of utilizing probabilistic data structures to handle interrogations regarding whether or not objects might be stored in an object store.

FIG. 5 depicts a flow chart of sample operations of a second example method 500 of utilizing probabilistic data structures to handle interrogations regarding whether or not objects might be stored in an object store. At block 501, a controller of an object storage device may operate. The flow may then proceed to block 502 where the controller determines whether or not an interrogation request regarding whether or not an object is stored in an object store of the object storage device is received. If so, the flow may proceed to block 503. Otherwise, the flow may return to block 501 where the controller continues to operate.

At block 503, after the controller determines an interrogation request is received, the controller may evaluate a probabilistic data structure using a key for the object. The flow may then proceed to block 504 where the controller may determine whether or not evaluation of the probabilistic data structure indicates that the object is definitely not stored in the object store or may possibly be stored in the object store. If the evaluation indicates that the object is definitely not stored, the flow may proceed to block 505. Otherwise, the flow may proceed to block 510.

At block 505, after determining the object is definitely not stored, the controller may respond that the object is not stored. Such a response may or may not include transmitting a response to the originator of the interrogation. The flow may then proceed to block 506.

At block 506, the controller may determine whether or not the interrogation is associated with a write request. If so, the flow may proceed to block 507. Otherwise, the flow may return to block 501 where the controller continues to operate.

At block 507, after the controller determines the interrogation is associated with a write request, the controller may allocate space for the object in the object store. The flow may then proceed to block 508 where the controller may update the probabilistic data structure based upon the storage of the object in the object store. The flow may then proceed to block 509 where the controller may store the object in the object store (such as in the space allocated at block 507). The flow may then return to block 501 where the controller continues to operate.

At block 510, after the evaluation indicates that the object may be stored, the controller may access the object store to attempt to locate the object. The flow may then proceed to block 511 where the controller may determine whether the access of the object store indicates the object is definitely stored or not. If the access determines the object is stored in the object store, the flow may proceed to block 512. Otherwise, the flow may proceed to block 505.

At block 512, after the access determines that the object is definitely stored in the object store, the controller may determine whether or not the interrogation is associated with a read request. If so, the flow may proceed to block 513. Otherwise, the flow may proceed to block 515.

At block 513, after the controller determines the interrogation is associated with a read request, the controller may optionally cache the object in memory and/or otherwise copy the object to memory. Regardless of whether or not the controller caches the object in memory and/or otherwise copies the object to memory, the flow may proceed to block 514 where the controller may provide the object to the originator of the interrogation. The flow may then return to block 501 where the controller continues to operate.

At block 515, after the controller determines the interrogation is not associated with a read request, the controller may determine whether or not the interrogation is associated with a write request. If not, the flow may return to block 501 where the controller continues to operate. Otherwise, the flow may proceed to block 516 where the controller may store or overwrite the object to the object store. The flow may then return to block 501 where the controller continues to operate.

Although the example method 500 is illustrated and described as including particular operations performed in a particular order, it is understood that this is an example. In various implementations, various orders of the same, similar, and/or different operations may be performed without departing from the scope of the present disclosure. For example, although the method is illustrated and described as including particular operations for handling interrogations associated with read and write requests, it is understood that other requests are possible and various implementations may include particular operations for handling interrogations associated with other types of requests.

Figure 6:
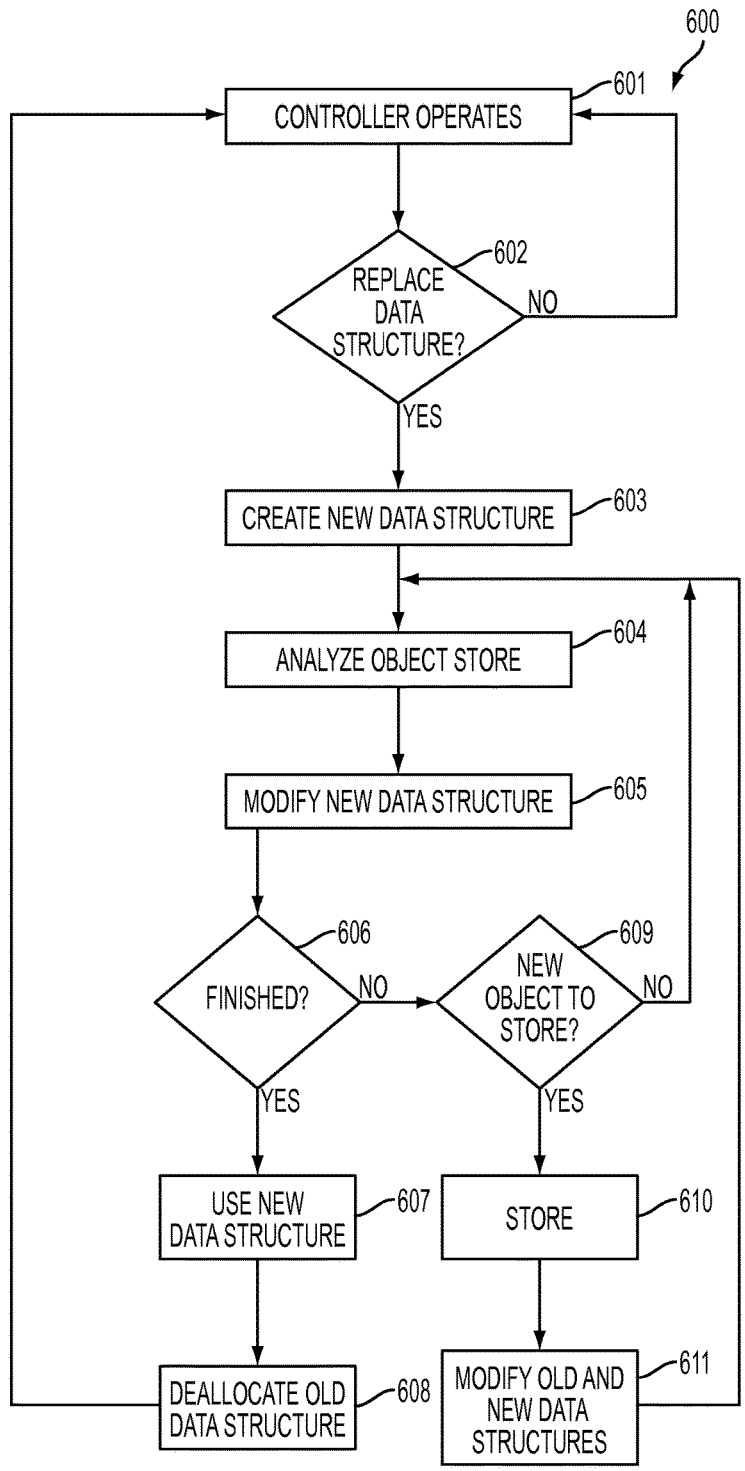
FIG. 6 depicts a flow chart of sample operations of an example method for replacing a probabilistic data structure that may be utilized to handle interrogations regarding whether or not objects might be stored in an object store.

FIG. 6 depicts a flow chart of sample operations of an example method 600 for replacing a probabilistic data structure that may be utilized to handle interrogations regarding whether or not objects might be stored in an object store. At block 601, a controller of an object storage device may operate. The flow may then proceed to block 602 where the controller determines whether or not to replace a probabilistic data structure having data related to the presence of data in an object store of the object storage device. If not, the flow returns to block 601 where the controller continues to operate. Otherwise, the flow proceeds to block 603.

At block 603, after the controller determines to replace the probabilistic data structure, the controller may create a new probabilistic data structure. In implementations where the probabilistic data structure is a Bloom filter or other data structure where bit values of one indicate the possible presence of objects in the object store, the new probabilistic data structure may be created with all zero values. The flow may then proceed to block 604.

At block 604, the controller may analyze the object store. The flow may then proceed to block 605 where the controller modifies the new probabilistic data structure for an object found in the object store while analyzing for which the new probabilistic data structure was not previously modified. The flow may then proceed to block 606 where the controller may determine whether or not the new probabilistic data structure has been modified for all objects in the object store. If so, the flow may proceed to block 607. Otherwise, the flow may proceed to block 609.

At block 607, after the controller determines the new probabilistic data structure has been modified for all objects in the object store, the flow may proceed to block 607 where the controller may use the new probabilistic data structure instead of the old probabilistic data structure. The flow may then proceed to block 608 where the controller may deallocate memory assigned to the old probabilistic data structure. The flow may then return to block 601 where the controller continues to operate.

At block 609, after the controller determines the new probabilistic data structure has not been modified for all objects in the object store, the controller may determine whether or not a request to store a new object in the object store is received while the new probabilistic data structure is being modified. If not, the flow returns to block 604 where the controller may continue analyzing the object store to determine whether the object store includes additional objects for which the new probabilistic data structure has not yet been modified. Otherwise, the flow may proceed to block 610.

At block 610, after the controller determines that a request to store a new object in the object store is received while the new probabilistic data structure is being modified, the controller may store the new object in the object store. The flow may then proceed to block 611 where the controller may modify the new probabilistic data structure and the old probabilistic data structure to indicate that the new object is stored in the object store. The flow may then return to block 604 where the controller may continue analyzing the object store to determine whether the object store includes additional objects for which the new probabilistic data structure has not yet been modified.

Although the example method 600 is illustrated and described as including particular operations performed in a particular order, it is understood that this is an example. In various implementations, various orders of the same, similar, and/or different operations may be performed without departing from the scope of the present disclosure. For example, although the method is illustrated and described as performing operations 603-611 in a linear and sequential fashion, it is understood that this is an example. In various implementations, various operations of the operations 603-611 may be performed in a simultaneous or substantially simultaneous fashion without departing from the scope of the present disclosure.

Figure 7:
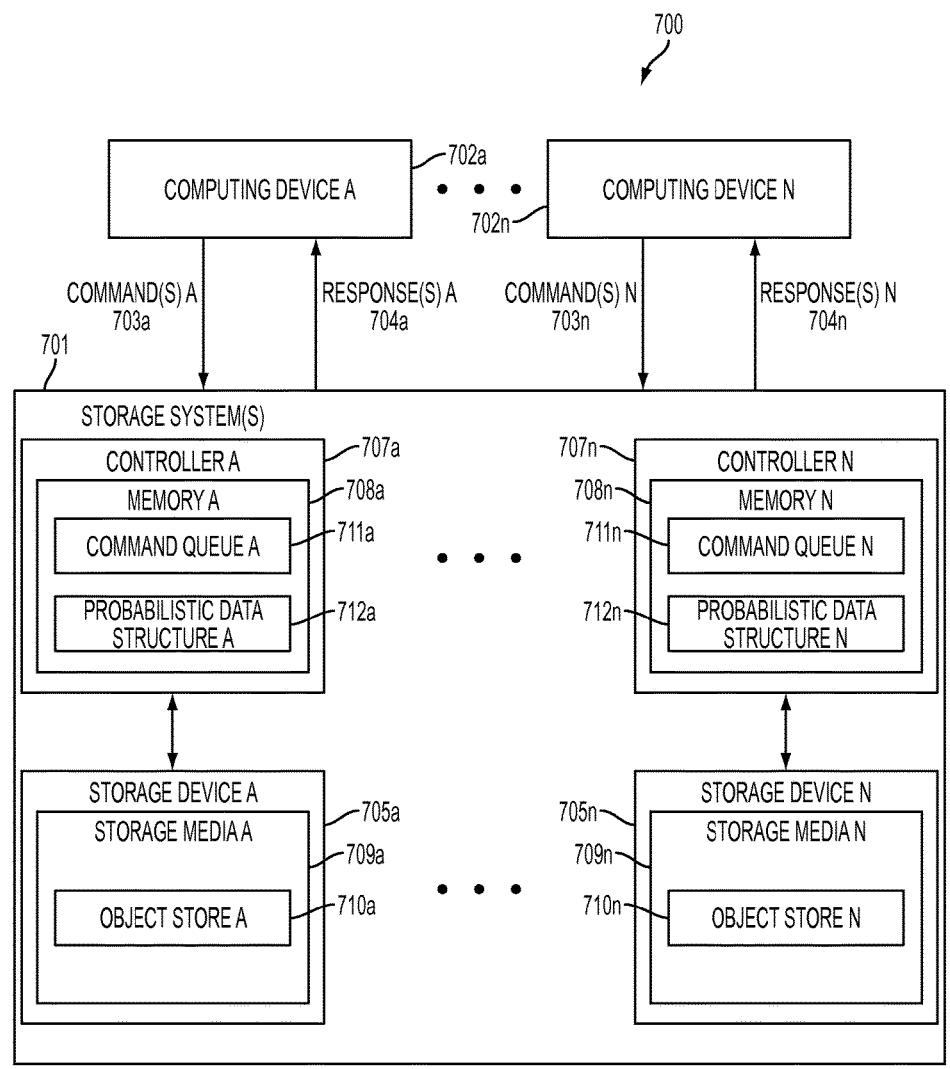
FIG. 7 depicts a simplified block diagram of another example system with example controllers that may be configured to utilize probabilistic data structures to handle interrogations regarding whether or not objects might be stored in object stores of associated object storage devices.

FIG. 7 depicts a simplified block diagram of another example system 700 with example controllers 707a-707n that may be configured to utilize probabilistic data structures 712a-712n to handle interrogations regarding whether or not objects might be stored in object stores 710a-710n of associated object storage devices 705a-705n. By way of contrast with the example system 100 of FIG. 1, the example system 700 is illustrated as including various numbers of computing devices 702a-702n that may transmit commands 703a-703n to and/or receive responses 704a-704n from one or more storage systems 700 that may include one or more controllers 707a-707n which may each be dedicatedly associated with a respective object storage device 705a-705n. As illustrated, each controller 707a-707n may include a memory 708a-708 that may store a respective command queue 711a-711n and a respective probabilistic data structure 712a-712n and each object storage device 705a-705n may include a storage media 709a-709n which may store one or more respective object stores 710a-710n. Each of the respective probabilistic data structures 712a-712n may have data related to the presence of data in the respective associated object store 710a-710n.

Figure 8:
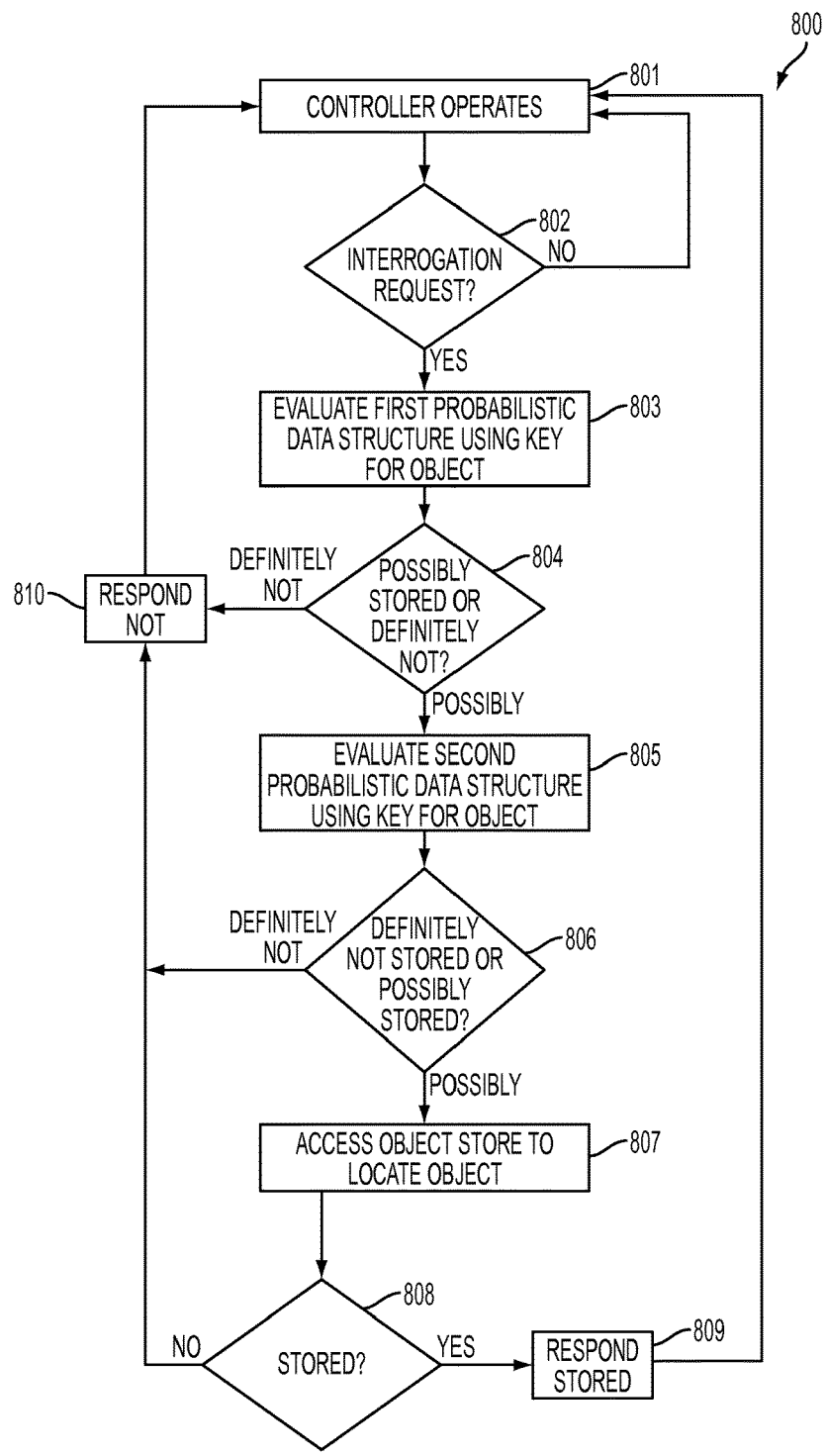
FIG. 8 depicts a flow chart of sample operations of a third example method of utilizing probabilistic data structures to handle interrogations regarding whether or not objects might be stored in an object store.

FIG. 8 depicts a flow chart of sample operations of a third example method 800 of utilizing probabilistic data structures to handle interrogations regarding whether or not objects might be stored in an object store. At block 801, a controller of an object storage device may operate. The flow may then proceed to block 802 where the controller determines whether or not an interrogation request regarding whether or not an object is stored in an object store of the object storage device is received. If so, the flow may proceed to block 803. Otherwise, the flow may return to block 801 where the controller continues to operate.

At block 803, after the controller determines an interrogation request is received, the controller may evaluate a first probabilistic data structure using a key for the object. The flow may then proceed to block 804 where the controller may determine whether or not evaluation of the first probabilistic data structure indicates that the object is definitely not stored in the object store or may possibly be stored in the object store. If the evaluation indicates that the object is definitely not stored, the flow may proceed to block 810. Otherwise, the flow may proceed to block 805.

At block 810, after determining the object is definitely not stored, the controller may respond that the object is not stored. Such a response may or may not include transmitting a response to the originator of the interrogation. Such a response may also involve one or more operations for handling a command associated with the interrogation and the particular operations may depend on the type of associated command. The flow may then return to block 801 where the controller continues to operate.

At block 805, after evaluation of the first probabilistic data structure indicates that the object might possibly be stored in the object store, the controller may evaluate a second probabilistic data structure using a key for the object. Evaluation of the first probabilistic data structure may be faster than evaluation of the second probabilistic data structure, such as where the first probabilistic data structure is smaller than the second probabilistic data structure or includes fewer values in a lookup set than the second probabilistic data structure. The flow may then proceed to block 806 where the controller may determine whether or not evaluation of the second probabilistic data structure indicates that the object is definitely not stored in the object store or may possibly be stored in the object store. If the evaluation indicates that the object is definitely not stored, the flow may proceed to block 810. Otherwise, the flow may proceed to block 807.

At block 807, after evaluation of the second probabilistic data structure indicates that the object may be stored, the controller may access the object store to attempt to locate the object. The flow may then proceed to block 808 where the controller may determine whether the access of the object store indicates the object is definitely stored or not. If the access determines the object is stored in the object store, the flow may proceed to block 809. Otherwise, the flow may proceed to block 810.

At block 809, after the access determines that the object is definitely stored in the object store, the controller may respond that the object is stored. Such a response may or may not include transmitting a response to the originator of the interrogation. Such a response may also involve one or more operations for handling a command associated with the interrogation and the particular operations may depend on the type of associated command. The flow may then return to block 801 where the controller continues to operate.

Although the example method 800 is illustrated and described as including particular operations performed in a particular order, it is understood that this is an example. In various implementations, various orders of the same, similar, and/or different operations may be performed without departing from the scope of the present disclosure. For example, the method is illustrated and described as utilizing two probabilistic data structures. However, in various implementations any number of different probabilistic data structures may be utilized without departing from the scope of the present disclosure.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

I claim:

1. An object storage device, comprising:
    control circuitry;
    a storage media operative to store an object store; and
    a memory coupled to the control circuitry operative to store a first probabilistic data structure having data indicating the presence of data in the object store, and further operative to store a second probabilistic data structure having data indicating the presence of data in the same object store, wherein the first probabilistic data structure is at least one of smaller than the second probabilistic data structure and includes fewer values in a lookup set than the second probabilistic data structure such that use of the second probabilistic data structure results in less false positives than use of the first probabilistic data structure, and wherein the first probabilistic data structure is at least one of a Bloom filter, a quotient filter, and an approximate membership query data structure; and
    wherein the control circuitry is configured to:
        receive an interrogation from a computing device for an object;
        utilize the first probabilistic data structure to determine whether the object is possibly stored in the object store or definitely not stored in the object store on the storage media by generating a hash value from at least one of the object, a name of the object, and a key associated with the object and comparing the hash value to values of the first probabilistic data structure;
        in response to the determination that the object is possibly stored in the object store when utilizing the first probabilistic data structure, utilize the second probabilistic data structure to further determine whether the object is possibly stored in the object store or definitely not stored in the object store on the storage media;
        in response to a determination that the object is definitely not stored in the object store when utilizing either the first probabilistic data structure or the second probabilistic data structure, respond to the interrogation that the object is not stored in the object store; and
        in response to a determination that the object is possibly stored in the object store when utilizing the second probabilistic data structure, access the object store to determine if the object is definitely stored in the object store or definitely not stored in the object store.

2. The object storage device of claim 1, wherein the control circuitry is further configured to respond to the interrogation that the object is not stored in the object store, in the event the access of the object store determines that the object is definitely not stored in the object store.

3. The object storage device of claim 1, wherein the control circuitry is further configured to allocate space in the object store for the object, in the event it is determined that that object is definitely not stored in the object store when utilizing the first probabilistic data structure or the second probabilistic data structure and the interrogation is associated with a write request.

4. The object storage device of claim 1, wherein the control circuitry is further configured to, in the event the object is determined to be definitely stored in the object store and the interrogation is associated with a read request, perform at least one of:
    copying the object to memory; and
    providing the object to the computing device.

5. The object storage device of claim 1, wherein the control circuitry is further configured to allocate space in the object store for the object, in the event the access of the object store determines that the object is definitely not stored in the object store and the interrogation is associated with a write request.

6. The object storage device of claim 1, wherein the control circuitry is further configured to replace a probabilistic data structure, wherein the replacing comprises:
    creating a new probabilistic data structure by analyzing objects stored in the object store;
    modifying the probabilistic data structure and the new probabilistic data structure to account for objects allocated in the object store while the new probabilistic data structure is being created; and
    utilizing the new probabilistic data structure instead of the probabilistic data structure once creation of the new probabilistic data structure is complete.

7. The object storage device of claim 6, wherein the control circuitry is further configured to determine to replace the probabilistic data structure upon at least one of:
    occurrence of more than a threshold number of false positives;
    expiration of a period of time; and receipt of more than a threshold number of delete requests.

8. The object storage device of claim 1, wherein the storage media is further operative to store a second object store and the memory is further operative to store a third probabilistic data structure having data indicating the presence of data in the second object store, and wherein the control circuitry is further configured to utilize the third probabilistic data structure to determine that the object is possibly stored in the second object store or definitely not stored in the second object store.

9. A controller of an object storage device, comprising:
control circuitry; and
a memory coupled to the control circuitry operative to store a first probabilistic data structure having data indicating the presence of data in an object store of the object storage device, and further operative to store a second probabilistic data structure having data indicating the presence of data in the same object store of the object storage device, wherein the first probabilistic data structure is at least one of smaller than the second probabilistic data structure and includes fewer values in a lookup set than the second probabilistic data structure such that use of the second probabilistic data structure results in less false positives than use of the first probabilistic data structure, and wherein the first probabilistic data structure is at least one of a Bloom filter, a quotient filter, and an approximate membership query data structure; and
wherein the control circuitry is configured to:
receive an interrogation from a computing device for an object;
utilize the first probabilistic data structure to determine that the object is possibly stored in the object store or definitely not stored in the object store by generating a hash value from at least one of the object, a name of the object, and a key associated with the object and comparing the hash value to values of the first probabilistic data structure;
in response to the determination that the object is possibly stored in the object store when utilizing the first probabilistic data structure, utilize the second probabilistic data structure to further determine whether the object is possibly stored in the object store or definitely not stored in the object store;
in response to a determination that the object is definitely not stored in the object store when utilizing either the first probabilistic data structure or the second probabilistic data structure, respond to the interrogation that the object is not stored in the object store; and
in response to a determination that the object is possibly stored in the object store when utilizing the second probabilistic data structure, access the object store to determine if the object is definitely stored in the object store or definitely not stored in the object store.

10. A method for operating a controller of an object storage device, the method comprising:
receiving an interrogation for an object from a computing device utilizing a controller of an object storage device;
utilizing a first probabilistic data structure stored in a memory of the object storage device, the first probabilistic data structure having data indicating the presence of data in an object store of the storage device, to determine that the object is possibly stored in the object store or definitely not stored in the object store by generating a hash value from at least one of the object, a name of the object, and a key associated with the object and comparing the hash value to values of the first probabilistic data structure, wherein the first probabilistic data structure is at least one of a Bloom filter, a quotient filter, and an approximate membership query data structure;
in response to the determination that the object is possibly stored in the object store when utilizing the first probabilistic data structure, utilizing a second probabilistic data structure to further determine whether the object is possibly stored in the same object store or definitely not stored in the object store, wherein the first probabilistic data structure is at least one of smaller than the second probabilistic data structure and includes fewer values in a lookup set than the second probabilistic data structure such that use of the second probabilistic data structure results in less false positives than use of the first probabilistic data structure;
in response to a determination that the object is definitely not stored in the object store when utilizing the first probabilistic data structure or the second probabilistic data structure, responding to the interrogation utilizing the controller that the object is not stored in the object store; and
in response to a determination that the object is possibly stored in the object store when utilizing the second probabilistic data structure, accessing the object store to determine if the object is definitely stored in the object store or definitely not stored in the object store.

11. The method of claim 10, further comprising responding to the interrogation that the object is stored in the object store in response to the accessing of the object store determining the object is definitely stored in the object store.

12. The method of claim 10, further comprising replacing a probabilistic data structure, wherein the replacing comprises:
creating a new probabilistic data structure by analyzing objects stored in the object store;
modifying the probabilistic data structure and the new probabilistic data structure to account for objects allocated in the object store while the new probabilistic data structure is being created; and
utilizing the new probabilistic data structure instead of the probabilistic data structure once creation of the new probabilistic data structure is complete.

* * * * *